(12) United States Patent  (10) Patent No.: US 8,124,225 B2
Kim et al.  (45) Date of Patent: Feb. 28, 2012

(54) AQUEOUS FLOOR POLISHING COMPOSITION

(75) Inventors: Kyung Don Kim, Hudson, OH (US); James Gaston, II, Rock Hill, SC (US)

(73) Assignee: OMNOVA Solutions Inc., Fairlawn, OH (US)

( * ) Notice: Subject to any disclaimer, the term of this patent is extended or adjusted under 35 U.S.C. 154(b) by 420 days.

(21) Appl. No.: 12/374,252

(22) PCT Filed: Jul. 17, 2007

(86) PCT No.: PCT/US2007/016188
§ 371 (c)(1),
(2), (4) Date: Apr. 28, 2009

(87) PCT Pub. No.: WO2008/011020
PCT Pub. Date: Jan. 24, 2008

(65) Prior Publication Data
US 2009/0324936 A1    Dec. 31, 2009

Related U.S. Application Data

(60) Provisional application No. 60/831,648, filed on Jul. 18, 2006, provisional application No. 60/903,981, filed on Feb. 28, 2007.

(51) Int. Cl.
*B32B 27/08* (2006.01)
*C08G 63/02* (2006.01)
(52) U.S. Cl. ........ 428/335; 428/461; 528/176; 528/190; 528/193; 528/195; 528/271; 528/272

(58) Field of Classification Search ............. 428/335, 428/461; 528/176, 190, 193, 194, 271, 272
See application file for complete search history.

(56) References Cited

U.S. PATENT DOCUMENTS

| | | | |
|---|---|---|---|
| 3,385,728 A | 5/1968 | Walsh | |
| 5,166,259 A | 11/1992 | Schmeing et al. | |
| 5,744,429 A | 4/1998 | Chung et al. | |
| 6,337,359 B1 | 1/2002 | Diehl | |
| 6,425,978 B1 | 7/2002 | Diehl et al. | |
| 6,610,769 B1 | 8/2003 | Blanpain et al. | |
| 6,660,828 B2 | 12/2003 | Thomas et al. | |
| 7,022,801 B2 | 4/2006 | Medsker | |
| 2005/0215678 A1 | 9/2005 | Ludtke et al. | |

FOREIGN PATENT DOCUMENTS

| | | |
|---|---|---|
| JP | 2000 034444 A | 2/2000 |
| WO | WO 0107529 A1 | 2/2001 |
| WO | WO 0202864 A1 | 1/2002 |

OTHER PUBLICATIONS

International Search Report, PCT/US07/16188, as cited in WO 2008/011020, pp. 39-41, dated Nov. 22, 2007.

*Primary Examiner* — Terressa Boykin
(74) *Attorney, Agent, or Firm* — Arthur M. Reginelli

(57) ABSTRACT

An aqueous floor care composition comprising water, polymer particles wherein the polymer particles include units derived from a conjugated diene monomer, units derived from an acidic monomer, and units derived from a hard, non-acidic monomer, an external crosslinking agent, and optionally one or more of a leveling agent, surfactant, polyurethane, alkali-soluble resin, coalescing agent, plasticizer, and wax.

59 Claims, No Drawings

AQUEOUS FLOOR POLISHING COMPOSITION

This application is a national phase application of International Patent Application No. PCT/US2007/016188, filed on Jul. 7, 2007, and gains the benefit of U.S. Provisional Application No. 60/831,648, filed Jul. 18, 2006, and U.S. Provisional Application No. 60/903,981, filed Feb. 28, 2007, which are incorporated herein by reference.

FIELD OF THE INVENTION

One or more embodiments of the present invention relates to an aqueous floor care composition that may be used on wooden floorings, artificial floorings made of synthetic resins, and concrete, marble and other stone floors.

BACKGROUND OF THE INVENTION

Floor polishing agents have been used to protect and enhance the appearance of floor surfaces. Floor polishing agents include oil-based agents such as solvents, aqueous agents, emulsion-type agents and the like. The polishing agent may be applied to the floor surface to form a film coating and dried.

Floor polish performance properties include scratch resistance, scuff and black mark resistance, and gloss. The polish desirably forms a film at room temperature, and dries to form a durable protective coating. If the coating becomes damaged, it is desirably removable.

SUMMARY OF THE INVENTION

One or more embodiments of the present invention provides an aqueous floor care composition comprising water, polymer particles wherein the polymer particles include units derived from a conjugated diene monomer, units derived from an acidic monomer, and units derived from a hard, non-acidic monomer, an external crosslinking agent, and optionally one or more of a leveling agent, surfactant, polyurethane, alkali-soluble resin, coalescing agent, plasticizer, and wax.

One or more embodiments of the present invention also provides a coated floor comprising, a substrate, and a coating on a surface of the substrate, wherein the coating includes a cross-linked polymer containing units derived from a conjugated diene monomer, units derived from an acidic monomer, and units derived from a hard, non-acidic monomer.

One or more embodiments of the present invention further provides a method of preparing a coated floor, the method comprising applying to a floor an aqueous floor care composition comprising water, polymer particles wherein the polymer particles include units derived from a conjugated diene monomer, units derived from an acidic monomer, and units derived from a hard, non-acidic monomer, optionally one or more of a leveling agent, coalescing agent, plasticizer, and wax, and allowing said composition to dry to form a film on the floor.

One or more embodiments of the present invention also provides a latex composition comprising water, and polymer particles, where the polymer particles include units derived from a conjugated diene monomer, units derived from a hard, non-acidic monomer, and from bout 5 to about 20 wt. % units derived from an acidic monomer, based upon the entire weight of the polymer particles, where the particles are substantially compositionally homogeneous.

DETAILED DESCRIPTION OF ILLUSTRATIVE EMBODIMENTS

One or more embodiments of the present invention provide an aqueous floor care composition, which may also be referred to as a floor finish, a floor polish, or a floor wax. Other embodiments are directed toward a method of preparing a coated floor by using the aqueous floor care composition, and a coated floor.

In one or more embodiments, the floor care composition includes a latex, i.e. an aqueous dispersion of polymer particles, sometimes referred to as an emulsion polymer. In one or more embodiments, the latex includes water, polymer particles, and optionally other materials.

In one or more embodiments, the polymer particles may be characterized by having a Tg from about 10° C. to about 100° C., in other embodiments, from about 20° C. to about 80° C., and in other embodiments, from about 40° C. to about 60° C. In one or more embodiments, the polymer particles may be characterized by having a Tg that is greater than 10° C., in other embodiments greater than 30° C., in other embodiments greater than 50° C., and in other embodiments greater than 70° C. The Tg may be determined based upon dried samples or films of the latex using DSC techniques.

In one or more embodiments, the polymer particles may be characterized by having a gel content of from about 0 to about 100 weight percent, in other embodiments, from about 30 to about 90 weight percent, and in other embodiments from about 60 to about 85 weight percent, based upon the entire weight of the particles. Gel is typically determined based on insoluble fractions within a solvent such as THF or toluene.

In one or more embodiments, the polymer particles may be characterized by including from about 0.5 to about 20%, in other embodiments, from about 5 to about 18%, and in other embodiments from about 10 to about 15%, units bearing an acid functionality, e.g., a carboxylic acid group, based upon the entire weight of the polymer particles. Acid content can be determined based upon the weight of the acid bearing monomers employed in synthesizing the polymer or by FTIR techniques.

In certain embodiments, the acid values of the polymer may be tailored to provide good durability, black heel mark (BHM) resistance, and good water resistance. In one or more embodiments, the acid value represents the milligrams (mg) of potassium hydroxide (KOH) necessary to neutralize the carboxylic acids present in 1 gram (g) of polymer. Theoretical acid values of the acrylic acid is about 779, and for methacrylic acid about 652. In one example, the theoretical acid value of a polymer containing 10% by weight of units derived from methacrylic acid would be 65, rounded to the nearest integer. In one or more embodiments, the acid value for the polymer of the present invention is from about 30 to about 180 and in other embodiments from about 50 to about 90.

In one or more embodiments, the average particle size of the polymer particles is from about 70 to about 140 nanometers (nm). In one or more embodiments, the average particle size of the polymer particles is less than 100 nm, in other embodiments less than 90 nm, and in other embodiments less than 80 nm.

Unless otherwise specified, the diameters of the polymer particles, i.e. particle size, is an average determined by capillary hydrodynamic fractionation (CHDF). The particle size analyzer employed was provided by Matec Applied Sciences, Northborough, Mass. CHDF is a chromatographic method in which particles elute at different times from a narrow-bore capillary column, depending upon the latex size. Those skilled in the art appreciate that particle size data generated from methods employing different physical principles cannot always be directly correlated due to factors such as the density, shape, and optical properties of the particles within the latex, yet they can be correlated by using principles known in the art. In one or more embodiments, the particle size distribution is less than 2.0, in other embodiments less than 1.5, in other embodiments less than 1.1, and in other embodiments about 1.05.

In certain embodiments, the polymer particles may include units derived from a conjugated diene monomer, units derived from an acidic monomer, units derived from a hard, non-acidic monomer, and optionally units derived from other functional monomers.

In one or more embodiments, the polymer particles contain 2 or more compositionally distinct regions, e.g., core/shell. In other embodiments, the composition of the particles is substantially homogeneous throughout.

In one or more embodiments, conjugated diene monomers include those that may be polymerized to produce elastomeric polymers or polymers having a Tg below about 25. In one embodiment, conjugated diene monomers include those that may be homopolymerized to produce elastomeric polymers or polymers having a Tg below about −35° C. In another embodiment, conjugated diene monomers include those that may be homopolymerized to produce elastomeric polymers or polymers having a Tg below about −55° C. Conjugated dienes include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

In one or more embodiments, acidic monomers include those monomers that include both a carboxylic acid group as well as a polymerizable group. In certain embodiments, acidic monomers may include both hard and soft monomers. Acidic monomers include α, β-unsaturated carboxylic acids, vinyl versatic acids, and mixtures thereof. Examples of α, β-unsaturated carboxylic acids include, but are not limited to, methacrylic acid, itaconic acid, citraconic acid, cinnamic acid, acrylic acid, fumaric acid, maleic acid, acids derived from anhydrides such as maleic anhydride, and mixtures thereof.

In one or more embodiments, hard non-acidic monomers include those monomers that do not include a carboxylic acid functionality and may be homo-polymerized to produce thermoplastic polymers or those polymers having a Tg in excess of about 0° C. In one embodiment, hard non-acidic monomers include monomers that may be polymerized to produce polymers having a Tg in excess of about 75° C. In another embodiment, hard non-acidic monomers include monomers that may be polymerized to produce polymers having a Tg in excess of about 90° C. Hard non-acidic monomers include vinyl aromatic monomers such as styrene, α-methyl styrene, t-butyl styrene, alkyl substituted styrene, divinyl benzene, and mixtures thereof, as well as polyunsaturated divinyl compounds. Hard non-acidic monomers also include acrylates such as methyl methacrylate, butyl methacrylate, isobutyl methacrylate, vinyl acetate, and mixtures thereof. Hard non-acidic monomers further include acrylonitrile, acrylamides such as methyl acrylamide, 2-acrylamido-2-methylpropane sulfonic acid, the salts of this acid (e.g., sodium, potassium, or ammonium salts), phosphate functional monomers, sulfur-containing monomers, and mixtures thereof.

In one or more embodiments, other functional monomers include monomers that help to control the hydrophilic-hydrophobic properties of the polymer. In one or more embodiments, functional monomers may improve the compatibility of the polymer with one or more additives. In one or more embodiments, functional monomers may affect hydrogen bonding with acid groups of the polymer.

Examples of functional monomers include 2-hydroxyethyl acrylate (HEA), 2-hydroxyethyl methacrylate (HEMA), n-methylol acrylamide (n-MA), n-methylol methacrylamide (n-MMA), acrylamide, methacrylamide, and the like.

The relative amounts of the various monomers employed to synthesize the polymer particles may be tailored in order to achieve desired polymer characteristics. Also, especially in the case of the glass transition temperature (Tg), the Tg can be controlled by manipulating the relative amount of the hard and soft monomers. In one or more embodiments, the level of hard monomer employed in synthesizing the polymer is directly related to the Tg of the polymer. In other words, as the level of hard monomer is increased, the Tg will increase.

It will be understood that the relative amounts described below may be approximated by the amount of monomer charged to the polymerizable mixture where there is substantially complete conversion.

In one or more embodiments, the polymer particles include from about 5 to about 50 wt. % in another embodiment, from about 10 to about 40 wt. %, and in yet another embodiment, from about 20 to about 35 wt. % of units (i.e., mer units of a polymer) deriving from conjugated diene monomer, based upon the total weight of the polymer particle.

In one or more embodiments, the polymer particles include from about 1 to about 30 percent by weight (wt. %), in another embodiment from about 7 to about 25 wt. %, and in yet another embodiment from about 10 to about 20 wt. %, units derived from an acidic monomer, based upon the total weight of the polymer particle.

In one or more embodiments, the polymer particles include from about 0 to about 80 percent by weight (wt. %), in another embodiment from about 1 to about 75 wt. %, in another embodiment from about 30 to about 70 wt. %, and in yet another embodiment from about 40 to about 60 wt. %, units derived from a hard non-acidic monomer, based upon the total weight of the polymer particle.

In one or more embodiments, the polymer particles include from about 0 to about 10 percent by weight (wt. %), in another embodiments from about 1 to about 10 wt. %, in another embodiment from about 3 to about 7 wt. %, units derived from a functional monomer, based upon the total weight of the polymer particle. In particular embodiments, acrylonitrile is employed as a functional monomer, and the polymer particles include at least 1 wt. %, in other embodiments at least 2 wt. %, in other embodiments at least 2.5 wt. %, and in other embodiments at least 3 wt. % units derived from acrylonitrile, based upon the total weight of the polymer particle. In these or other embodiments, polymer particles may include less than 7 wt. %, in other embodiments less than 5 wt. %, and in other embodiments less than 4 wt. % units derived from acrylonitrile based upon the total weight of the polymer particle.

In one or more embodiments, the polymer particles include copolymer synthesized from monomers including 1,3-butadiene, styrene, methacrylic acid, and optionally itaconic acid. In one embodiment, the polymer particles include from about 5 to about 50 wt. % units deriving from 1,3-butadiene, from about 0 (or 1) to about 80 wt. % units deriving from styrene, from about 1 to about 20 wt. % units deriving from methacrylic acid, and from about 0 (or 0.1) to about 5 wt. % units deriving from itaconic acid, based on the entire weight of the particle.

In another embodiment the polymer particles include from about 10 to about 40 wt. % units deriving from 1,3-butadiene, from about 10 to about 80 wt. % units deriving from styrene, from about 5 to about 18 wt. % units deriving from methacrylic acid, and from about 1 to about 3 wt. % units deriving from itaconic acid, based on the entire weight of the particle.

In yet another embodiment, the polymer particles include from about 20 to about 30 wt. % units deriving from 1,3-butadiene, from about 40 to about 70 wt. % units deriving from styrene, from about 10 to about 15 wt. % units deriving from units deriving from methacrylic acid, and from about 0 (or 0.1) to about 1.5 wt. % units deriving from deriving from itaconic acid, based on the entire weight of the particle.

In certain embodiments, one or more of the specific compositions described above further include from about 0.5 to about 10 wt. % units derived from acrylonitrile, and in other embodiments from about 2 to about 5 wt. % units derived from acrylonitrile.

The polymer particles may be prepared by employing conventional emulsion polymerization techniques such as those described in U.S. Pat. Nos. 5,166,259 and 6,425,978, which are incorporated herein by reference. These processes include those that employ the use of a free-radical initiator to initiate the polymerization of monomer.

In one or more embodiments, the polymer particles are formed by a method comprising the steps of providing a polymerizable mixture of monomers, initiator, and water, and polymerizing the monomers to form a latex. The mixture may further include a reducing agent, a surfactant, an internal cross-linking agent, a chain transfer agent, a defoamer, a metal ion scavenger, a plasticizer, a froth agent, or two or more of the foregoing, as well as other optional materials that are conventionally employed in the art.

In one or more embodiments, the initiator includes a free-radical emulsion polymerization initiator. Examples of initiators include ammonium persulfate, sodium persulfate, potassium persulfate, tert-butyl hydroperoxide, and di-tert-butyl cumene.

In one embodiment, from about 0.1 to about 2 parts by weight, and in another embodiment, from about 0.5 to about to about 1.5 parts by weight initiator per 100 parts by weight monomer is employed.

In one or more embodiments, the initiator may be used in conjunction with a reducing agent such as iron salts, amines, ascorbic acids, sodium salts of ascorbates, sodium formaldehyde sulfoxylates, and mixtures thereof.

In one embodiment, from about 0.1 to about 2 parts by weight, and in another embodiment, from about 0.5 to about to about 1.5 parts by weight reducing agent per 100 parts by weight monomer is employed.

In one or more embodiments, a surfactant may be present during the emulsion polymerization and formation of the polymer particles. In other words, the polymerizable mixture may include a surfactant. This surfactant may be referred to as an internal surfactant. In one or more embodiments, the internal surfactant includes an alkali metal salt of an alkyl sulfosuccinate, a salt of an alkyl sulfate, or a salt of an organo disulfonate. Useful alkali salts of alkyl sulfosuccinates include sodium dihexyl sulfosuccinate, sodium dioctyl sulfosuccinate, sodium octane sulfonate, alkyl phenol ethoxylates, fatty alcohol ethoxylates, alkyl polyglucosides, alkyl phosphates, and mixtures thereof. Useful surfactants include those available under the tradenames Aerosol™ MA-80 (Cytec), Gemtex™ 80 (Finetex), or MM-80™ (Uniqema).

In another embodiment, the surfactant includes salts of alkyl sulfates and salts of organo disulfonates. Useful salts of alkyl sulfates include sodium lauryl sulfate, which is available under the tradename Stepanol WA as well as Texapon™ (Cognis), Polystep™ B-3 (Stepan), Polystep™ B-5 (Stepan), or Rhodapon™ UB (Rhodia). Useful salts of organo disulfonates include sodium dodecyl diphenyloxide disulfonate, which is available under the tradename Dowfax 2A1 as well as Stepanol™ AM, Polystep™ B-7 (Stepan), Rhodapon™ L-22EP (Rhodia), Dowfax™ 2A1 (Dow), Calfax™ DB-45 (Pilot), Rhodacal™ DSB (Rhodia), or Aerosol™ DPOS-45 (Cytec). Other useful surfactants include sodium laureth sulfate, Laureth-3 (a.k.a. triethylene glycol dodecyl ether), Laureth-4 (a.k.a. PEG-4 lauryl ether), Laureth-5 (a.k.a. PEG-5 lauryl ether), Laureth-6 (a.k.a. PEG-6 lauryl ether), Laureth-7 (a.k.a. PEG-7 lauryl ether), sodium lauryl ether sulfate, sodium laureth-12 sulfate (a.k.a. PEG (12) lauryl ether sulfate, and sodium laureth-30 sulfate (a.k.a. PEG (30) lauryl ether sulfate). Other ether alkyl sulfates are available under the tradenames Polystep™ B40 (Stepan) or Genapol™ TSM. Further examples of surfactants include sodium dodecyl benzene sulfonate (SDBS) type surfactant, Rhodacal DS-1 and Rhodacal DS-4. In certain embodiments, mixtures of surfactants are advantageously used. For example, one may employ a combination of sodium dodecyl diphenyloxide disulfonate and sodium lauryl sulfate in a weight ratio of from about 0.5:1 to about 1.5:1.

Examples of surfactants are further described in U.S. Patent Application Publication No. 2005/215,678 A1, which is hereby incorporated by reference.

The surfactant is typically present within the polymerizable mixture in an amount from about 0.1 to about 5% by weight, in other embodiments from about 0.5 to about 3% by weight, and in other embodiments from about 1 to about 2% by weight based upon the total weight of the monomers charged to the polymerizable mixture.

In one or more embodiments, the polymerizable mixture may include an internal crosslinking agent. Examples of crosslinking agents include t-dodecyl mercaptan, n-dodecyl mercaptan, di-vinyl benzene, ethylene glycol di-methacrylate, tri-methylolpropane di-allylether, tri-methylolpropane di-acrylate, tri-methylolpropane tri-acrylate, and tri-methylolpropane tri-methacrylate.

The internal crosslinking agent may be present within the polymerizable mixture in an amount from about 0.4 to about 2% by weight, in other embodiments from about 0.5 to about 1.5% by weight, and in other embodiments from about 0.6 to about 1% by weight based upon the total weight of the monomers charged to the polymerizable mixture.

In one or more embodiments, the polymerizable mixture may include a plasticizer and/or coalescing agent. It is believed that the presence of the plasticizer and/or coalescing agent during polymerization advantageously allows for more incorporation of the plasticizer into the polymer particle. Useful plasticizers include dibutyl phthalate, dioctyl phthalate, 2-pyrrolidone, octyl diphenyl phosphate, and tributoxyethyl phosphate. Examples of coalescing agents include alcohols such as ethanol, isopropyl alcohol, etc.; polyvalent alcohols such as ethylene glycol, glycol ethers such as diethylene glycol monomethyl ether, dipropylene glycol monobutyl ether, diethylene glycol monoethyl ether, dipropylene glycol monomethyl ether, dipropylene glycol monoethyl ether, ethylene glycol mono-2-methyl hexyl ether, texanol ester alcohol, and diethylene glycol mono-2-ethyl hexyl ether. As those skilled in the art appreciate, plasticizers and coalescing agents are examples of compounds that can lower the film formation temperature of the latex composition. Those skilled in the art also appreciate that other types of compounds that lower the film formation temperature of the latex without having a deleterious impact on the stability of the polymer latex may be employed. In one or more embodiments, use can be made of compounds that lower the film formation temperature of the latex by at least 5° C., in other embodiments by at least 10° C., and in other embodiments by at least 20° C. The film formation temperature of a latex can be determined as set forth in *An Applied Approach to Film Formation for Waterborne Industrial Coatings* by J. W. Taylor et al., presented at the INTERNATIONAL WATERBORNE, HIGH SOLIDS, AND POWDER COATINGS SYMPOSIUM, February 2002, New Orleans, La.

In one or more embodiments, the polymerizable mixture may include from about 0.1 to about 10% by weight, in other embodiments from about 0.5 to about 5% by weight, and in other embodiments from about 1 to about 3% by weight plasticizer and/or coalescing agent based upon the total weight of the monomers charged to the polymerizable mixture.

In one or more embodiments, the polymerizable mixture may include a chain transfer agent or other molecular weight controller. These agents may be advantageously employed to control the gel content of the polymer. Examples of chain transfer agents include n-dodecyl mercaptan (n-DDM), t-dodecyl mercaptan (t-DDM), monothioglycerol, mercapto acetates, and long chain alcohols.

In one or more embodiments, the polymerizable mixture may include from about 0.1 to about 3.0% by weight, and in other embodiments from about 0.1 to about 2% by weight chain transfer agent based upon the total weight of the monomers charge the polymerizable mixture.

Preparation of the polymers or latexes of this invention is not limited to any particular emulsion polymerization technique. Accordingly, a single-charge batch polymerization process may be used, a continuous system may be used, which typically employs a CSTR, a semi-batch or continuous-feed process may be used, or an incremental process may be employed. Polymerization may be carried out at a temperature of about 60° C. to about 90° C., or in other embodiments from about 65 to about 80° C. In one or more embodiments, the polymerization may be carried out at pressures from about 7 psi to about 15 psi, and at a solids concentration of from about 35 to about 50% by weight.

In one or more embodiments, an incremental polymerization process is employed. For example, a seed polymer particle may be formed by charging monomer, optionally surfactant, and optionally plasticizer to an aqueous polymerization medium. Once a seed is formed, additional monomer and surfactant may be incrementally added to the polymerization medium. Once the polymerization has reached a desirable conversion, the solids content of the medium can be adjusted and unreacted monomer stripped from the system. Also, after polymerization, additional surfactants can be added, as well as stabilizers and other constituents that may be useful in the latex.

The pH can be neutralized by the addition of a base such as potassium hydroxide, sodium bicarbonate, ammonium hydroxide, sodium hydroxide, organic amines such as triethylamine, AMP 95, and mixtures thereof. As those skilled in the art will appreciate, it is conventional to neutralize the latex to a pH of about 4.5 to about 8.0, or in other embodiments from about 5.5 to about 7.5.

In one or more embodiments, the viscosity is less than about 250 centipoise (cps), when measured by a Brookfield viscometer using spindle #1 at 60 rpm.

In one or more embodiments, the latex may have a solids content of from about 30 to about 55 wt. %, and in another embodiment from about 44 to about 48 wt. %, based upon the total weight of the latex composition. In certain embodiments, the solids content of the latex includes from about 80 to about 99 wt. % polymer, in other embodiments, from about 85 to about 98 wt. % polymer.

In one or more embodiments, the latex may be characterized by having distinctly low volatile organic compounds. In one or more embodiments, the latex is characterized by having a free styrene content (i.e., styrene monomer content) of less than 300 ppm, in other embodiments less than 200 ppm, and in other embodiments less than 180 ppm.

In one or more embodiments, the latex compositions of the present invention are characterized by a distinctly low sentiment content. In one or more embodiments, the sentiment content is less than 0.1 wt. %, in other embodiments less than 0.05 wt. %, in other embodiments less than 0.01 wt. %, and in other embodiments less than 0.005 wt. %, as determined according to ASTM D-1290.

The latex may further include any of the floor care components described hereinbelow that may be pre-mixed with the latex without deleteriously affecting the transport or storage stability, or other properties of the latex composition.

In one or more embodiments, the latex of the present invention is useful in aqueous floor care compositions. In one or more embodiments, the latex is combined with an external crosslinking agent and optionally other ingredients, to form an aqueous floor care composition.

In one embodiment, the external crosslinking agent includes a polyvalent metal salts or a polyvalent metal complex. Examples of crosslinking agents include aziridine, calcium, magnesium, zinc, barium, aluminum, zirconium, nickel, iron, cadmium, strontium, bismuth, beryllium, cobalt, lead, lithium, copper, titanium and antimony salts or complexes. In one embodiment, the ligand for forming the polyvalent metal complexes may include carbonate ion, acetate ion, oxalate ion, malate ion, hydroxyacetate ion, tartrate ion, acrylate ion, lactate ion, octate ion, formate ion, salicylate ion, benzoate ion, gluconate ion, glutamate ion, and glycine, alanine, ammonia, morpholine, ethylenediamine, dimethylaminoethanol, diethyamionethanol, monoethanolamine, diethnolamine, triethanolamine, as well as inorganic acids, organic acids, amino acids, amines and the like. Specific examples include zinc ammonium carbonate, calcium ethylenediamine-ammonium carbonate, zinc ammonium acetate, zinc ammonium acrylate, zinc ammonium malate, zirconium ammonium malate, zinc ammonium aminoacetate, and calcium ammonium alanine.

In one or more embodiments, the amount of external crosslinking agent employed may be calculated based upon the molar equivalents of acid groups within the polymer chain. As those skilled in the art appreciate, the purpose of the crosslinking agent is to link polymer particles or individual polymers together. In those embodiments where the crosslinking agent is difunctional, one crosslinking agent is advantageously employed for every two acid functionalities present within the latex. In certain embodiments, from about 0.25 to about 0.5 moles of crosslinking agent are employed per equivalent of acid group within the polymer.

In one or more embodiments, it may be advantageous to add an external crosslinking agent to the polymerization medium after formation of the latex, but prior to the formation of the floor care composition. For example, the external crosslinking agent may be added to the latex composition and may be stored or shipped. The floor care composition may then be prepared by adding additional ingredients that may be conventionally employed in preparing floor care compositions.

In one or more embodiments, the floor care composition includes one or more optional ingredients such as waxes, alkali-soluble resins, polyurethane resins, plasticizers, silica sols, coalescing agents, light stabilizers, antioxidants, and external surfactants.

In one or more embodiments, the floor care composition includes a wax. In certain embodiments, the wax may affect sliding properties, durability, and black heel mark resistance of the floor coating. In one embodiment, the wax includes an aqueous solution of a natural wax or a synthetic wax dispersion. Examples of natural waxes include carnauba wax, paraffin wax and the like. Examples of synthetic waxes include polyethylene, polypropylene and oxides thereof, waxes obtained by polymerizing unsaturated monomers such as ethylene, propylene and the like or monomers selected from the group consisting of a-or-ethylenically unsaturated carboxylic acid, alkyl esters thereof and the like.

In one or more embodiments, the floor care composition includes from about 0 to about 80 wt. % of wax, in other embodiments from about 1 to about 30 wt. % of wax, or in other embodiments from about 5 to about 20 wt. % of wax, based upon the total weight of the nonvolatile components of the aqueous composition.

In one or more embodiments, the floor care composition includes an alkali-soluble resin. In certain embodiments, the alkali-soluble resin may affect the leveling properties of the floor care coating composition. Examples of alkali-soluble resin include styrene-acrylic acid copolymer resin, styrene-maleic acid copolymer resin, rosin-maleic acid copolymer resin, water-soluble acrylic resin, water-soluble polyester resin, and water-soluble epoxy resin.

In one or more embodiments, the floor care composition include from about 0 to about 50 wt. % of alkali-soluble resin, in other embodiments from about 1 to about 20 wt. % of alkali-soluble resin, or in other embodiments from about 3 to about 10 wt. % of alkali-soluble resin, based upon the total weight of the aqueous composition.

In one or more embodiments, the floor care composition includes an aqueous polyurethane-type resin. In certain embodiments, the polyurethane resin may affect the durability of the floor care coating composition. Examples of aqueous polyurethane-type resins include those containing a carboxylic acid and/or carboxylate bonded to a chain of a polyurethane-type resin. In one embodiment, aqueous polyurethane-type resin may be obtained by combining a diol having a carboxylic acid group, a diol, and a di-isocyanate, neutralizing the carboxylic acid group as needed, and polymerizing.

In one or more embodiments, the floor care composition include from about 0 to about 50 wt. % of aqueous polyurethane type resin, in other embodiments from about 1 to about 80 wt. % of aqueous polyurethane-type resin, in other embodiments from about 10 to about 60 wt. % of aqueous polyurethane-type resin, in other embodiments from about 20 to about 40 wt. % of aqueous polyurethane-type resin, based upon the total weight of the aqueous composition.

In one or more embodiments, the floor care composition includes a plasticizer. In certain embodiments, the plasticizer lowers the minimum film forming temperature of the composition, such that the composition forms a continuous film at temperatures of at least 7° C. Examples of plasticizers include dibutyl phthalate, dioctyl phthalate, 2-pyrrolidone, octyl diphenyl phosphate, and tributoxyethyl phosphate.

In one or more embodiments, the floor care composition include from about 0 to about 5 wt. % of plasticizer, based upon the total weight of the aqueous composition. In other embodiments, the floor care composition includes from about 1 to about 4 wt. % of plasticizer, and in yet other embodiments, from about 2 to about 3 wt. % plasticizer, based upon the total weight of the aqueous composition.

In one or more embodiments, the floor care composition includes a coalescing agent. In certain embodiments, the coalescing agent provides lowers the minimum film forming temperature of the composition, such that the composition forms a continuous film at temperatures of at least 50° C., or in other embodiments at least 70° C. Examples of coalescing agents include alcohols such as ethanol, isopropyl alcohol, etc.; polyvalent alcohols such as ethylene glycol, glycol ethers such as diethylene glycol monomethyl ether, dipropylene glycol monobutyl ether, diethylene glycol monoethyl ether, dipropylene glycol monomethyl ether, dipropylene glycol monoethyl ether, ethylene glycol mono-2-methyl hexyl ether, texanol ester alcohol, and diethylene glycol mono-2-ethyl hexyl ether. Coalescing agents are sometimes referred to as temporary plasticizers or film forming agents.

In one or more embodiments, the floor care composition include from about 0 to about 10 wt. % of coalescing agent, in other embodiments from about 1 to about 7 wt. % of coalescing agent, or in other embodiments from about 3 to about 5 wt. % of coalescing agent, based upon the total weight of the aqueous composition.

In one or more embodiments, the floor care composition includes a leveling agent. Examples of leveling agents include polyfluorooxetanes, non-ionic surfactants, anionic surfactants, silicone-based surfactants, and fluorine-based surfactants. Leveling agents based upon polyfluorooxetanes are further described in U.S. Pat. Nos. 6,660,828 and 7,022,801, both of which are hereby incorporated by reference.

In one embodiment, the leveling agent may be present within the floor care composition in an amount from about 0 to about 5 wt. %, in another embodiment, from about 0.1 to about 4.5 wt. %, and in yet another embodiment, from about 1 to about 3.5 wt. %, based upon the total weight of the aqueous floor care composition.

In one or more embodiments, the floor care composition includes an external surfactant. An external surfactant is one that is not present during the polymerization of the polymer particles. Examples of external surfactants that may be employed include any of those described hereinabove as internal surfactants.

In one embodiment, the external surfactant may be present within the floor care composition in an amount from about 0 to about 5 wt. %, in another embodiment, from about 0.1 to about 4.5 wt. %, and in yet another embodiment, from about 0.5 to about 4 wt. %, based upon the total weight of the aqueous floor care composition. Stated another way, in one embodiment, the surfactant is present in an amount from about 0.1 to about 5, in another embodiment, from about 1 to about 4, and in yet another embodiment, from about 1.5 to about 3 parts by weight surfactant per 100 parts by weight polymer, where the parts by weight surfactant refer to active surfactant content.

In one or more embodiments, the floor care composition may further include preservatives, defoamers, anti-fungal agents, fragrances, dyestuffs, brighteners, antioxidants, or ultraviolet absorbing agents. Examples of antioxidants include Bostex™ 759, available from Akron Dispersions, and Irganox™ 1520, available from CIBA-Geigy.

In one or more embodiments, the floor care composition may be prepared by introducing or combining the latex, crosslinking agent, and optionally other components and blending them together. The order of addition is not particularly limited. In other embodiments, one or more of the components may be pre-mixed with the latex. In these or other embodiments, one or more of the components may be pre-mixed with a carrier such as water, and then added to the floor care composition.

In one or more embodiments, the aqueous floor care composition may be characterized as a dispersion, i.e., solid particles are dispersed within the water. In one or more embodiments, the dispersion may have a non-volatile solids content of from about 15 to about 40 wt %, and in another embodiment from about 16 to about 25 wt. %, based upon the total weight of the aqueous composition. In certain embodiments, the non-volatile solids content of the dispersion includes from about 70 to about 99 wt. % polymer, in other embodiments, from about 75 to about 98 wt. % polymer, and in other embodiments, from about 80 to about 85 wt. % polymer.

In one or more embodiments, the viscosity of the floor care composition is less than about 10 centipoise (cps), when measured by a Brookfield viscometer using spindle #1 at 60 rpm.

In one or more embodiments, the aqueous floor care coating composition may be used as a polishing agent for substrates including floors, furniture, and vehicles. In one embodiment, a coated floor is prepared by applying the aqueous coating composition to a floor substrate by fabric coating, brush spraying, or brushing, and allowing the coating to dry in air or by heating. Advantageously, the aqueous coating may be applied to the substrate at room temperature and air dried.

In certain embodiments, especially where the coated floor becomes dirty or damaged, the polishing agent may be removed by using ammonia or an alkaline removing agent, and replaced by a fresh coating of polishing agent.

In other embodiments, especially where the degree of dirt or damage is not so extensive as to require removal and replacement of the floor polish, the coating may be melted and flattened by grinding. The melting and flattening treatment is sometimes referred to as buffing.

In one or more embodiments, the aqueous floor care composition may be used as a floor polish composition suitable for coating wooden floorings, artificial floorings made of synthetic resins, and concrete, marble, and other stone floors.

In certain embodiments, the coated floor exhibits advantageous water resistance, scratch resistance, initial gloss, and gloss retention. In one or more embodiments, the coated floor does not exhibit yellowing. In one embodiment, the coated floor may be in a hospital or other health care facility and exhibits good resistance to disinfecting alcohols. In these or other embodiments, method of preparing a coated floor provides recoat times of less than 20 minutes. It is believed that the method of the present invention provides faster recoat times than conventional floor coatings due to the superior water resistance of the composition of the present invention.

In one or more embodiments, the composition of the present invention can be used to prepare a coated floor that has a coating thickness (i.e., film thickness) of from about 1 to about 70 micrometers ($\mu m$), in other embodiments from about 5 to about 50 $\mu m$, and in other embodiments from about 10 to about 30 $\mu m$. As noted above, the thickness of the film can be developed over several coatings or applications to a substrate.

In one or more embodiments, the film coatings formed by applying the composition of the present invention to a substrate may be characterized by distinctly advantageous gloss. For example, in one or more embodiments, the gloss may be 65 or greater, in other embodiments 70 or greater, or in other embodiments 75 or greater as determined by ASTM D-1455-87 (at 60° with 3 coats at an application rate of 2 milliliters per square foot on a standard vinyl tile).

In other embodiments, the present invention provides a clear, wood coating. In one or more embodiments, the wood coating composition includes an aqueous dispersion of polymer particles, and optionally other materials.

In one embodiment, the polymer particles employed in the wood coating may be as characterized as having a Tg, gel content, and particle size as described hereinabove for the floor care composition. In one or more embodiments, these polymer particles may include units derived from a conjugated diene monomer, units derived from an acidic monomer, and units derived from a hard, non-acidic monomer and/or a hydroxyl functional monomer. The conjugated diene monomer, acidic monomer, and hard, non-acidic monomer may be as described hereinabove.

In one or more embodiments, the polymer particles employed in the wood coating may be characterized by including from about 10 to about 20%, and in other embodiments, from about 11 to about 18%, units bearing an acid functionality, e.g., a carboxylic acid group, based upon the entire weight of the polymer particles. Acid content can be determined based upon the weight of the acid bearing monomers employed in synthesizing the polymer or by FTIR techniques.

In certain embodiments, the acid values of the polymer employed in the wood coating may be tailored to provide good stain and water resistance. In one or more embodiments, the acid value represents the milligrams (mg) of potassium hydroxide (KOH) necessary to neutralize the carboxylic acids present in 1 gram (g) of polymer. Theoretical acid values of the acrylic acid is about 779, and for methacrylic acid about 652. In one example, the theoretical acid value of a polymer containing 10% by weight of units derived from methacrylic acid would be 65, rounded to the nearest integer. In one or more embodiments, the acid value for the polymer of the present invention is from about 65 to about 180.

In one or more embodiments, the hydroxyl functional monomers used to make the polymer of the wood coating include 2-hydroxyethyl acrylate (HEA), 2-hydroxyethyl methacrylate (HEMA), n-methylol acrylamide (n-MA), n-methylol methacrylamide (n-MMA), acrylamide, methacrylamide, and the like.

In one or more embodiments, the polymer particles include from about 0 to about 10 percent by weight (wt. %), in another embodiment from about 3 to about 7 wt. %, units derived from a functional monomer, based upon the total weight of the polymer particle.

In one or more embodiments, the polymer particles employed in the wood coating may be polymerized by employing conventional emulsion polymerization techniques to form a latex. In one embodiment, the polymer particles may be prepared as described hereinabove.

In one or more embodiments, the wood coating composition may further include pigments, colorants, siccatives, dispersing agents, leveling agents, light stabilizers and fillers, flatting agents, silica, theology modifiers, thickeners, crosslinking agents, and other additives known in the art of wood coating compositions. Wood coating additives are further described in U.S. Pat. No. 4,447,567, which is hereby incorporated by reference.

In one or more embodiments, the aqueous wood coating composition may be applied to wood substrates or substrates made from processed wood, such as hardboard, paper or chipboard. In one or more embodiments, the wood coating cures upon drying, forced drying, or crosslinking at elevated temperatures.

In other embodiments, the present invention provides a clear, glossy overprint varnish. In one or more embodiments, the overprint varnish composition includes an aqueous dispersion of polymer particles, and optionally other materials.

In one embodiment, the polymer particles employed in the overprint varnish may be as characterized as having a Tg, gel content, and particle size as described hereinabove for the floor care composition. In one or more embodiments, the polymer particles may include units derived from a conjugated diene monomer, units derived from an acidic monomer, and units derived from a hard, non-acidic monomer and/or from a hydroxyl functional monomer. The conjugated diene monomer, acidic monomer, hard, non-acidic monomer and functional monomer may be as described hereinabove.

In one or more embodiments, the polymer particles employed in the overprint varnish may be characterized by including from about 0 to about 20%, and in other embodiments, from about 1 to about 18%, units bearing an acid functionality, e.g., a carboxylic acid group, based upon the entire weight of the polymer particles. Acid content can be determined based upon the weight of the acid bearing monomers employed in synthesizing the polymer or by FTIR techniques.

In certain embodiments, the acid values of the polymer employed in the overprint varnish may be tailored to provide good stain and water resistance. In one or more embodiments, the acid value represents the milligrams (mg) of potassium hydroxide (KOH) necessary to neutralize the carboxylic acids present in 1 gram (g) of polymer. Theoretical acid values of the acrylic acid is about 779, and for methacrylic acid about 652. In one example, the theoretical acid value of a polymer containing 10% by weight of units derived from methacrylic acid would be 65, rounded to the nearest integer. In one or more embodiments, the acid value for the polymer of the present invention is from about 5 to about 180.

In one or more embodiments, the hydroxyl functional monomers employed to make the polymers used in the overnight varnish include 2-hydroxyethyl acrylate (HEA), 2-hydroxyethyl methacrylate (HEMA), n-methylol acrylamide (n-MA), n-methylol methacrylamide (n-MMA), acrylamide, methacrylamide, and the like.

In one or more embodiments, the polymer particles include from about 0 to about 10 percent by weight (wt. %), in another embodiment from about 3 to about 7 wt. %, units derived from a functional monomer, based upon the total weight of the polymer particle.

In one or more embodiments, the polymer particles employed in the overprint varnish may be polymerized by employing conventional emulsion polymerization techniques to form a latex. In one embodiment, the polymer particles may be prepared as described hereinabove.

In one or more embodiments, the overprint varnish coating composition may be cured by forced air drying. In one or more embodiments, these curable composition may further include a polysiloxane. Examples of polysiloxanes are described in U.S. Pat. No. 5,744,429, which is hereby incorporated by reference.

In one embodiment, the polysiloxane may be present in an amount of from about 0.1 to about 3.0% by weight, in another embodiment, from about 0.2 to about 1.0% by weight, based on the total weight of the curable overprint varnish composition.

In one or more embodiments, the curable overprint varnish composition may further include dyes, wetting agents, and other additives known in the art of coating compositions.

In one or more embodiments, the curable overprint varnish coating compositions may be employed to forming coatings on fibrous and cellulosic substrates or on plastic, plastics coated fibrous or cellulosic substrates, or on other substrates, e.g. metal.

The curable coating compositions may be applied over substrates having conventional printing inks printed thereon and dried or forced air dried to provide a protective overprint for printed matter, e.g. publications, posters, packaging and the like. In one or more embodiments, the curable overprint varnish coating compositions may be applied as thin coatings to suitable substrates by any of the known methods suitable for the application of such coatings, for example roll coating, gravure coating, doctor blade, spraying or brushing.

In order to demonstrate the practice of the present invention, the following examples have been prepared and tested. The examples should not, however, be viewed as limiting the scope of the invention. The claims will serve to define the invention.

EXAMPLES

Experiment 1

Five polymer latexes were prepared by employing the ingredients set forth in Table I. An incremental polymerization process was employed using conventional techniques. In particular, seed particles were formed by charging itaconic acid, styrene, surfactant, chelating agent (ethylenediaminetetraacetic acid), and optionally plasticizer (dipropylene glycol monobutyl ether) to an aqueous medium. These ingredients were mixed and the temperature was increased to about 70-80° C. The initiator (sodium persulfate) was then charged to form the seed particle. The remaining monomer were then incrementally charged in 12 incremental charges with 30 minutes between each charge. The monomer ratio in each charge was consistent except that where acrylonitrile was employed, it was charged in the first two charges.

Unreacted monomer was stripped from the system. The solids content of the latexes was adjusted to between about 39-41 wt. %, and the pH was adjusted to about 5-6 through the post addition of ammonium hydroxide. Also, a defoamer (Drewplus™ L-198), a biocide (Kathon™ LX), and an external crosslinking agent (zinc ammonium carbonate) were post added to the latex.

TABLE I

|  | Polymer 1 | Polymer 2 | Polymer 3 | Polymer 4 | Polymer 5 |
| --- | --- | --- | --- | --- | --- |
| Monomer |  |  |  |  |  |
| Styrene | 60.0 | 40.0 | 62.5 | 60.0 | 60.0 |
| Butadiene | 29.0 | 24.0 | 24.0 | 24.0 | 24.0 |
| Methyl Methacrylate | — | 20.0 | — | — | — |
| Acrylonitrite | — | — | — | 2.5 | 2.5 |
| Itaconic Acid | 1.0 | 1.0 | 1.0 | 1.0 | 1.0 |
| Methacrylic Acid | 10.0 | 15.0 | 12.5 | 12.5 | 12.5 |
| Total Monomer | 100 | 100 | 100 | 100 | 100 |
| Other Polymerization Ingredients |  |  |  |  |  |
| Water | 125.5 | 125.5 | 125.5 | — | — |
| Sodium Dodecyl benzene sulfonate | 1.3 | — | — | — | — |

TABLE I-continued

|  | Polymer 1 | Polymer 2 | Polymer 3 | Polymer 4 | Polymer 5 |
|---|---|---|---|---|---|
| Sodium Lauryl Sulfate | 0 | 1.3 | 1.3 | 1.6 | 1.0 |
| Sodium Dodecyl Diphenyloxide Disulfonate | — | — | — | — | 0.8 |
| Sodium Persulfate | 0.45 | 0.45 | 0.45 | 0.45 | 0.45 |
| Sulfole | 0.85 | 0.85 | 0.60 | 0.20 | 0.20 |
| Chelating Agent | 0.05 | 0.05 | 0.05 | 0.05 | 0.05 |
| Dipropylene Glycol Monobutyl Ether | — | — | — | — | 2.0 |
| Polymerization Post Additives |  |  |  |  |  |
| Defoamer | 0.15 | 0.15 | 0.15 | 0.15 | 0.15 |
| Ammonium Hydroxide (28%) | 0.24 | 0.24 | 0.24 | 0.24 | 0.24 |
| Zinc ammonium Carbonate | 13.35 | 13.35 | 13.35 | 13.35 | 13.35 |
| Biocide | 0.05 | 0.05 | 0.05 | 0.05 | 0.05 |

Experiment 2

The foregoing polymer latexes (Polymers 1-5) were formulated into five distinct floor wax compositions by blending the ingredients set forth in Table II.

TABLE II

| Ingredient | Wt. % |
|---|---|
| Water | 53.44 |
| Diethylene Glycol Ethyl Ether | 4.85 |
| Tributoxyethyl Phosphate | 2.85 |
| PolyFox TM-1 (30% active) | 0.05 |
| Proxel GXL | 0.5 |
| AC-325 (35% active) | 2.94 |
| Polymer Latex | 35.82 |

The foregoing ingredients were mixed by combining all of the ingredients except for the polymer latex and mixing for 10 minutes. The latex was subsequently added and mixing continued for 30 minutes. All mixing and blending occurred at standard conditions.

These floor wax compositions were analyzed according to various standardized tests and compared to a known floor wax composition based upon a latex obtained under the tradename ML™ 877 (OMNOVA Solutions). The comparative floor wax composition included 50.14% by weight water, 2.92% by weight diethylene glycol ethyl ether, 2.83% by weight tributoxyethyl phosphate, 0.01% by weight of an anti-foam agent obtained under the tradename Wacker™ SE-21 (Wacker), 0.05% by weight PolyFox™ TM-1 (OMNOVA Solutions), 0.09% by weight Proxel™ (Zeneca), 42.42% by weight latex, and 1.54% by weight AC-325 ((at 35%). The latex was added after 30 minutes of mixing, the AC-325 (wax emulsion) (OMNOVA Solutions) was added after 30 minutes of mixing with the latex, and then mixing continued for 30 minutes after the addition of AC-325; mixing was conducted at standard conditions.

Table III sets forth the results of various tests that were performed on the floor wax compositions. Table III also provides the standardized procedures that were followed for each test. It is noted that the stress film formation followed ASTM D-1455-87 except for the parameters set forth in the table.

TABLE III

|  | Comparative | Polymer 1 | Polymer 2 | Polymer 3 | Polymer 4 | Polymer 5 |
|---|---|---|---|---|---|---|
| FLOOR WAX COMPOSITION PROPERTIES |  |  |  |  |  |  |
| % Solids N.V | 20 | 20 | 20 | 20 | 20 |  |
| pH | 8.7 | 8.6 | 8.6 | 8.6 | 8.6 |  |
| Accelerated Aging (ASTM-D 1791-87) | Pass | Pass | Pass | Pass | Pass |  |
| Density (lb/gallon) | 8.7 | 8.6 | 8.6 | 8.6 | 8.6 |  |
| Viscosity (Brookfield Spindle #1@ 60 rpm) | 6 | 6 | 5 | 6 | 5 |  |
| APPLICATION PROPERTIES |  |  |  |  |  |  |
| Gloss (ASTM D 1455-87) |  |  |  |  |  |  |
| 20°/60° (4 Coats on Black VCT) |  |  |  |  |  |  |
| Coat 1 | 16.5 | 16.0 | 17.8 | 17.4 | 18.1 |  |
| Coat 2 | 43.5 | 41.7 | 51.2 | 52.1 | 54.0 |  |
| Coat 3 | 69.9 | 69.7 | 75.6 | 76.1 | 78.5 |  |
| Coat 4 | 83.0 | 82.9 | 86.2 | 87.0 | 88.5 |  |
| Stress Film Formation |  |  |  |  |  |  |
| 75° F./25% RH | 8 | 10 | 10 | 10 | 10 |  |
| 75° F./75% RH | 10 | 10 | 10 | 10 | 10 |  |
| 50° F./25% RH | 5 | 8 | 10 | 10 | 10 |  |
| 50° F./75% RH | 8 | 10 | 10 | 10 | 10 |  |
| Film Clarity (visual) | 10 | 9 | 10 | 10 | 10 |  |
| Drag Resistance | 10 | 10 | 10 | 10 | 10 |  |
| Flow & Leveling (Cheesecloth Applicator) | 10 | 10 | 10 | 10 | 10 |  |
| ADHESION PROPERTIES |  |  |  |  |  |  |
| Terrazzo ASTM D 3359-95a | 10 | 10 | 10 | 10 | 10 |  |
| Slip Resistance (ASTM D-2047) | .68 | .55 | .53 | .52 | .55 |  |

TABLE III-continued

| | Comparative | Polymer 1 | Polymer 2 | Polymer 3 | Polymer 4 | Polymer 5 |
|---|---|---|---|---|---|---|
| PERFORMANCE PROPERTIES | | | | | | |
| BHM Resistance (Snell Capsule) | 5 | 3 | 7 | 5 | 5 | |
| Hardness Build (Konig) | | | | | | |
| Day 1 | 47 | 12 | 33 | 23 | 25 | |
| Day 3 | 58 | 14 | 33 | 23 | 25 | |
| Day 7 | 62 | 14 | 33 | 23 | 25 | |
| Water Spot Resistance (ASTM D 1793-87) | 10 | 10 | 10 | 10 | 10 | |
| Detergent Resistance (ASTM D 3207-87) | | | | | | |
| Neutral Cleaner 1:128 | 10 | 10 | 10 | 10 | 10 | |
| Alkaline Cleaner 1:128 | 10 | 10 | 10 | 10 | 10 | |
| Alkaline Cleaner 1:64 | 8 | 10 | 8 | 9 | 9 | |
| Alkaline Cleaner 1:32 | 2 | 10 | 5 | 8 | 8 | |
| Long Term Removability (ASTM 1792-82) | 10 | 10 | 10 | 10 | 10 | |

Various modifications and alterations that do not depart from the scope and spirit of this invention will become apparent to those skilled in the art. This invention is not to be duly limited to the illustrative embodiments set forth herein.

What is claimed is:

1. An aqueous floor care composition comprising:
    water;
    polymer particles wherein the polymer particles include units derived from a conjugated diene monomer, units derived from an acidic monomer, and units derived from a hard, non-acidic monomer, where the polymer particles include at least 7% by weight units derived from the acidic monomer based on the total weight of the polymer particle;
    an external crosslinking agent; and
    optionally one or more of a leveling agent, surfactant, polyurethane, alkali-soluble resin, coalescing agent, plasticizer, and wax.

2. The composition of claim 1, where the polymer particles include from about 5 to about 50 wt. % polymeric units derived from a conjugated diene monomer.

3. The composition of claim 2, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

4. The composition of claim 1, where the polymer particles include from about 1 to about 30 wt. % polymeric units derived from an acidic monomer.

5. The composition of claim 4, where the acidic monomer is selected from the group consisting of α, β-unsaturated carboxylic acids, vinyl versatic acids, and mixtures thereof.

6. The composition of claim 1, where the polymer particles include from about 1 to about 75 wt. % polymeric units derived from a non-acidic hard monomer.

7. The composition of claim 6, where the hard monomer is selected from the group consisting of styrene, □-methyl styrene, t-butyl styrene, alkyl substituted styrene, divinyl benzene, a polyunsaturated divinyl compound, methyl methacrylate, butyl methacrylate, isobutyl methacrylate, vinyl acetate, acrylonitrile, methyl acrylamide, 2-acrylamido-2-methylpropane sulfonic acid, a sodium, potassium, or ammonium salt of 2-acrylamido-2-methylpropane sulfonic acid, and a mixture thereof.

8. The composition of claim 1, where the polymer particles include from about 1 to about 10 wt. % polymeric units deriving from a functional monomer.

9. The composition of claim 8, where the functional monomer is selected from the group consisting of 2-hydroxyethyl acrylate (HEA), 2-hydroxyethyl methacrylate (HEMA), n-methylol acrylamide (n-MA), n-methylol methacrylamide (n-MMA), acrylamide, and methacrylamide.

10. The composition of claim 1, where the polymer particles include from about 5 to about 50 wt. % units deriving from 1,3-butadiene, from about 1 to about 80 wt. % units deriving from styrene, from about 1 to about 20 wt. % units deriving from methacrylic acid, and from about 0.1 to about 5 wt. % units deriving from itaconic acid, based on the entire weight of the particle.

11. The composition of claim 10, where the polymer particles further include from about 0.1 to about 10 wt. % units derived from acrylonitrile.

12. The composition of claim 1, where the polymer particles include from about 10 to about 40 wt. % units deriving from 1,3-butadiene, from about 10 to about 80 wt. % units deriving from styrene, from about 5 to about 18 wt. % units deriving from methacrylic acid, and from about 1 to about 3 wt. % units deriving from itaconic acid, based on the entire weight of the particle.

13. The composition of claim 12, where the polymer particles further include from about 0.1 to about 10 wt. % units derived from acrylonitrile.

14. The composition of claim 1, where the polymer particles include from about 20 to about 30 wt. % units deriving from 1,3-butadiene, from about 40 to about 70 wt. % units deriving from styrene, from about 10 to about 15 wt. % units deriving from units deriving from methacrylic acid, and from about 0 to about 1.5 wt. % units deriving from deriving from itaconic acid, based on the entire weight of the particle.

15. The composition of claim 14, where the polymer particles further include from about 0.1 to about 10 wt. % units derived from acrylonitrile.

16. The composition of claim 1, where the polymer particles are dispersed within the aqueous composition, and where the amount of particles is from about 30 to about 55 wt. %, based upon the weight aqueous composition.

17. The composition of claim 1, where the polymer particles are characterized by having a Tg from about 10° C. to about 100° C., based upon dried samples or films of the aqueous composition using DSC techniques.

18. The composition of claim 1, where the external crosslinking agent is selected from the group consisting of zinc ammonium carbonate, calcium ethylenediamine-ammonium carbonate, zinc ammonium acetate, zinc ammonium acrylate, zinc ammonium malate, zirconium ammonium malate, zinc ammonium aminoacetate, and calcium ammonium alanine.

19. The composition of claim 1, where the aqueous composition comprises a leveling agent in an amount of from about 0.1 to about 5 wt. %, based upon the total weight of the aqueous composition.

20. The composition of claim 19, where the leveling agent comprises a polyfluorooxetane.

21. The composition of claim 1, where the aqueous composition comprises a coalescing agent in an amount of from about 1 to about 10 wt. %, based upon the total weight of the aqueous composition.

22. The composition of claim 21, where the coalescing agent is selected from the group consisting of ethanol, isopropyl alcohol, ethylene glycol, diethylene glycol monomethyl ether, diethylene glycol monoethyl ether, dipropylene glycol monomethyl ether, dipropylene glycol monoethyl ether, ethylene glycol mono-2-methyl hexyl ether, and diethylene glycol mono-2-ethyl hexyl ether.

23. The composition of claim 1, where the aqueous composition comprises a plasticizer in an amount of from about 0.1 to about 5 wt. %, based upon the total weight of the aqueous composition.

24. The composition of claim 23, where the plasticizer is selected from the group consisting of dibutyl phthalate, dioctyl phthalate, 2-pyrrolidone, octyl diphenyl phosphate, and tributoxyethyl phosphate.

25. The composition of claim 1, where the aqueous composition comprises a surfactant in an amount of from about 0.1 to about 5 wt. %, based upon the total weight of the aqueous composition.

26. The composition of claim 25, where the surfactant is selected from the group consisting of an alkali metal salt of an alkyl sulfosuccinate, a salt of an alkyl sulfate, and a salt of an organo disulfonate.

27. The composition of claim 25, where the surfactant is selected from the group consisting of sodium dihexyl sulfosuccinate, sodium dioctyl sulfosuccinate, sodium octane sulfonate, alkyl phenol ethoxylate, fatty alcohol ethoxylate, alkyl polyglucoside, alkyl phosphate, sodium lauryl sulfate, sodium dodecyl diphenyloxide disulfonate, sodium laureth sulfate, triethylene glycol dodecyl ether, PEG-4 lauryl ether, PEG-5 lauryl ether, PEG-6 lauryl ether, PEG-7 lauryl ether, sodium lauryl ether sulfate, PEG (12) lauryl ether sulfate, and PEG (30) lauryl ether sulfate.

28. The composition of claim 1, where the aqueous composition comprises a wax agent in an amount of from about 1 to about 80 wt. %, based upon the total weight of the aqueous composition.

29. The composition of claim 28, where the wax is selected from the group consisting of carnauba wax, paraffin wax, polyethylene, polyethylene oxide, polypropylene, polypropylene oxide, a wax obtained by polymerizing an ethylenically unsaturated carboxylic acid, and an alkyl ester of an ethylenically unsaturated carboxylic acid.

30. The composition of claim 1, where the aqueous composition further comprises an alkali-soluble resin selected from the group consisting of styrene-maleic acid copolymer resin, styrene-acrylic acid copolymer resin, rosin-maleic acid copolymer resin, water-soluble acrylic resin, water-soluble polyester resin, and water-soluble epoxy resin.

31. The composition of claim 23, where the aqueous composition further comprises a water soluble polyurethane resin.

32. A coated floor comprising:
a substrate; and
a coating on a surface of the substrate, wherein the coating includes a cross-linked polymer containing units derived from a conjugated diene monomer, units derived from an acidic monomer, and units derived from a hard, non-acidic monomer.

33. The coated floor of claim 32, where the substrate is selected from the group consisting of wooden flooring, artificial flooring made of synthetic resins, concrete, marble and other stone floor.

34. The coated floor of claim 32, where the polymer includes from about 5 to about 50 wt. % polymeric units derived from a conjugated diene monomer.

35. The coated floor of claim 34, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

36. The coated floor of claim 32, where the polymer includes from about 1 to about 30 wt. % polymeric units derived from an acidic monomer.

37. The coated floor of claim 36, where the acidic monomer is selected from the group consisting of α, β-unsaturated carboxylic acids, vinyl versatic acids, and mixtures thereof.

38. The coated floor of claim 32, where the polymer includes from about 0 to about 80 wt. % polymeric units derived from a non-acidic hard monomer.

39. The coated floor of claim 32, where the hard monomer is selected from the group consisting of styrene, □-methyl styrene, t-butyl styrene, alkyl substituted styrene, divinyl benzene, a polyunsaturated divinyl compound, methyl methacrylate, butyl methacrylate, isobutyl methacrylate, vinyl acetate, acrylonitrile, methyl acrylamide, 2-acrylamido-2-methylpropane sulfonic acid, a sodium, potassium, or ammonium salt of 2-acrylamido-2-methylpropane sulfonic acid, and a mixture thereof.

40. The composition of claim 32, where the polymer particles include from about 1 to about 10 wt. % polymeric units deriving from a functional monomer.

41. The composition of claim 40, where the functional monomer is selected from the group consisting of 2-hydroxyethyl acrylate (HEA), 2-hydroxyethyl methacrylate (HEMA), n-methylol acrylamide (n-MA), n-methylol methacrylamide (n-MMA), acrylamide, and methacrylamide.

42. The coated floor of claim 32, wherein the coating has a thickness of from about 1 to about 70 µm.

43. The coated floor of claim 32, wherein the coating has a thickness of from about 5 to about 50 µm.

44. A method of preparing a coated floor, the method comprising:
applying to a floor an aqueous floor care composition comprising:
water;
polymer particles wherein the polymer particles include units derived from a conjugated diene monomer, units derived from an acidic monomer, and units derived from a hard, non-acidic monomer;
optionally one or more of a leveling agent, coalescing agent, plasticizer, and wax; and
allowing said composition to dry to form a film on the floor.

45. The method of claim 44, where the floor is selected from the group consisting of wooden flooring, artificial flooring made of synthetic resins, concrete, marble and other stone floor.

46. The method of claim 44, where the polymer particles include from about 5 to about 50 wt. % polymeric units derived from a conjugated diene monomer.

47. The method of claim 44, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

48. The method of claim 44, where the polymer particles include from about 1 to about 30 wt. % polymeric units derived from an acidic monomer.

49. The method of claim 44, where the acidic monomer is selected from the group consisting of α, β-unsaturated carboxylic acids, vinyl versatic acids, and mixtures thereof.

50. The method of claim 44, where the polymer particles include from about 1 to about 80 wt. % polymeric units derived from a non-acidic hard monomer.

51. The method of claim 44, where the hard monomer is selected from the group consisting of styrene, □-methyl styrene, t-butyl styrene, alkyl substituted styrene, divinyl benzene, a polyunsaturated divinyl compound, methyl methacrylate, butyl methacrylate, isobutyl methacrylate, vinyl acetate, acrylonitrile, methyl acrylamide, 2-acrylamido-2-methylpropane sulfonic acid, a sodium, potassium, or ammonium salt of 2-acrylamido-2-methylpropane sulfonic acid, and a mixture thereof.

52. The method of claim 44, where the polymer particles include from about 1 to about 10 wt. % polymeric units deriving from a functional monomer.

53. The method of claim 52, where the functional monomer is selected from the group consisting of 2-hydroxyethyl acrylate (HEA), 2-hydroxyethyl methacrylate (HEMA), n-methylol acrylamide (n-MA), n-methylol methacrylamide (n-MMA), acrylamide, and methacrylamide.

54. The method of claim 44, where the polymer particles include from about 5 to about 50 wt. % units deriving from 1,3-butadiene, from about 1 to about 80 wt. % units deriving from styrene, from about 1 to about 20 wt. % units deriving from methacrylic acid, and from about 0.1 to about 5 wt. % units deriving from itaconic acid, based on the entire weight of the particle.

55. The method ion of claim 54, where the polymer particles further include from about 0.1 to about 10 wt. % units derived from acrylonitrile.

56. The method of claim 44, where the floor care composition includes an external crosslinking agent.

57. A latex composition comprising:
water; and
polymer particles, where the polymer particles include units derived from a conjugated diene monomer, units derived from a hard, non-acidic monomer, and from about 5 to about 20 wt. % units derived from an acidic monomer, based upon the entire weight of the polymer particles, where the particles are substantially compositionally homogeneous.

58. The method of claim 1, where the polymer particles include at least 10% by weight units derived from the acidic monomer based on the total weight of the polymer particle.

59. An aqueous floor care composition comprising:
water;
polymer particles wherein the polymer particles include units derived from a conjugated diene monomer, units derived from an acidic monomer, and units derived from a hard, non-acidic monomer, where the polymer particles are characterized by a Tg of greater than 50° C.;
an external crosslinking agent; and
optionally one or more of a leveling agent, surfactant, polyurethane, alkali-soluble resin, coalescing agent, plasticizer, and wax.

* * * * *